(12) United States Patent
Suppappola et al.

(10) Patent No.: US 7,555,117 B2
(45) Date of Patent: Jun. 30, 2009

(54) PATH CHANGE DETECTOR FOR ECHO CANCELLATION

(75) Inventors: Seth Suppappola, Tempe, AZ (US); Franklyn H. Story, Chandler, AZ (US)

(73) Assignee: Acoustic Technologies, Inc., Mesa, AZ (US)

(*) Notice: Subject to any disclaimer, the term of this patent is extended or adjusted under 35 U.S.C. 154(b) by 384 days.

(21) Appl. No.: 11/180,004

(22) Filed: Jul. 12, 2005

(65) Prior Publication Data
US 2007/0025282 A1    Feb. 1, 2007

(51) Int. Cl.
*H04M 9/08* (2006.01)

(52) U.S. Cl. ............ 379/406.08; 370/286; 370/289; 379/406.07; 379/413.01; 704/248

(58) Field of Classification Search .......... 379/388.04, 379/406.07, 406.08, 413.01; 370/286, 289; 704/248
See application file for complete search history.

(56) References Cited

U.S. PATENT DOCUMENTS

| | | | | |
|---|---|---|---|---|
| 4,972,406 A * | 11/1990 | Dedic | | 370/286 |
| 5,477,534 A | 12/1995 | Kusano | | 370/32.1 |
| 5,745,564 A * | 4/1998 | Meek | | 379/406.08 |
| 5,764,753 A * | 6/1998 | McCaslin et al. | | 379/406.07 |
| 6,035,034 A * | 3/2000 | Trump | | 379/406.06 |
| 6,185,300 B1 * | 2/2001 | Romesburg | | 379/406.09 |
| 6,212,273 B1 * | 4/2001 | Hemkumar et al. | | 379/406.08 |
| 6,226,380 B1 * | 5/2001 | Ding | | 379/413.01 |
| 6,240,128 B1 | 5/2001 | Banerjea et al. | | 375/222 |
| 6,351,531 B1 * | 2/2002 | Tahernezhaadi et al. | | 379/406.01 |
| 6,507,652 B1 * | 1/2003 | Laberteaux | | 379/406.05 |
| 6,775,653 B1 * | 8/2004 | Wei | | 704/248 |
| 6,792,106 B1 * | 9/2004 | Liu | | 379/406.05 |
| 6,804,203 B1 * | 10/2004 | Benyassine et al. | | 370/286 |
| 6,839,426 B1 * | 1/2005 | Kamoi et al. | | 379/406.01 |
| 6,944,288 B2 * | 9/2005 | Seibert | | 379/406.01 |
| 2004/0086109 A1 * | 5/2004 | Takada | | 379/406.08 |
| 2004/0228474 A1 * | 11/2004 | Taniguchi et al. | | 379/406.12 |
| 2005/0169457 A1 * | 8/2005 | Johnston et al. | | 379/406.08 |
| 2006/0198511 A1 * | 9/2006 | Su et al. | | 379/406.01 |
| 2008/0219432 A1 * | 9/2008 | Ahmadi | | 379/406.06 |

* cited by examiner

*Primary Examiner*—Gerald Gauthier
(74) *Attorney, Agent, or Firm*—Paul F. Wille

(57) ABSTRACT

A path change is detected by multiplying the energy of a signal on the output of a summation circuit in one channel of a telephone by a constant to produce a product. The product is compared with the energy of a signal on the input of the summation circuit. A path change is indicated when the energy of the product exceeds the energy of a signal on the input of the summation circuit. The comparison is made in successive frames of an audio signal and a path change is indicated when the energy of a signal on the input of the summation circuit is exceeded in two or more successive frames.

12 Claims, 4 Drawing Sheets

PATH CHANGE DETECTOR FOR ECHO CANCELLATION

BACKGROUND OF THE INVENTION

This invention relates to a telephone employing echo canceling circuitry and, in particular, to echo canceling circuitry that includes a path change detector.

As used herein, "telephone" is a generic term for a communication device that utilizes, directly or indirectly, a dial tone from a licensed service provider. As such, "telephone" includes desk telephones (see FIG. 1), cordless telephones (see FIG. 2), speaker phones (see FIG. 3), hands free kits (see FIG. 4), and cellular telephones (see FIG. 5), among others. For the sake of simplicity, the invention is described in the context of telephones but has broader utility; e.g. communication devices that do not utilize a dial tone, such as radio frequency transceivers.

There are two kinds of echo in a telephone system, an acoustic echo between an earphone or a loudspeaker and a microphone and electrical echo generated in the switched network for routing a call between stations. In a handset, acoustic echo is typically not much of a problem. In speaker phones, where several people huddle around a microphone and loudspeaker, acoustic feedback is much more of a problem. Hybrid circuits (two-wire to four-wire transformers) located at terminal exchanges or in remote subscriber stages of a fixed network are the principal sources of electrical echo.

One way to reduce echo is to program the frequency and phase response of a filter to match the frequency and phase response of an echo path. A filter typically used is a finite impulse response (FIR) filter having programmable coefficients. The echo is subtracted from the echo bearing signal at an input. This technique can reduce echo as much as 30 dB, depending upon the coefficient adaptation algorithm. Additional means using non-linear techniques are typically added to further reduce an echo. Approximating a solution for an adaptive filter is like trying clothes on a squirming child: the input signal keeps changing. At one extreme, sudden and/or large changes can upset the approximation process and make the process diverge rather than converge. At the other extreme, a low echo to noise ratio can cause instability.

Convergence relates to a process for approximating an answer. In high school, one is taught how to calculate the roots of a quadratic equation $f(x)=0$ from the coefficients of the terms on the left side of the equation. This is not the only way to solve the problem. One can simply substitute a value (a guess) for x in the equation and calculate a result. The guess is modified depending upon the difference (the error) between the calculated result and zero. The error could be as large numerically as the guess. Thus, some fraction of the error is typically used to adjust the guess. Hopefully, successive guesses come closer and closer to a root. This is convergence. Calculations stop when the size of the error becomes arbitrarily small. If there is overcorrection, the error becomes progressively larger. This is divergence. For a human being, this approach is time consuming and boring. For a computer, this approach is extremely useful and applicable to many situations other than solving quadratic equations.

A digital signal processor (DSP) can be programmed according to any one of the several available algorithms, which generally provide rapid convergence. If the echo path changes slowly, there is usually no problem. Thus, telephones using a handset usually do not present a problem. Abrupt changes, which are more likely with a speakerphone, for example, can cause the algorithm to diverge. Divergence is also more likely in algorithms with an adjustable step size; i.e. the step size is increased when it should not be increased.

When there is divergence, one of two things will happen. The system will eventually sense divergence and reset by going to half duplex mode or the system may produce echoes, if not noticeably distort the desired signal. In a worst case, both events happen, distortion followed by an eerie silence.

Adding a path change detector potentially adds the problem of false positive indications of a path change. The result is the same as for divergence. Thus, the problem is to cure one problem without making new ones.

In the prior art, U.S. Pat. No. 5,477,534 (Kusano) discloses monitoring abrupt changes in the coefficients of the FIR filter and modifying the abruptly changing coefficients to prevent divergence. U.S. Pat. No. 6,240,128 (Banerjea et al.) disclose preventing divergence by synchronizing sampling rates in the system.

In view of the foregoing, it is therefore an object of the invention to provide an efficient adaptive filter that is stable during abrupt changes in the echo path.

A further object of the invention is to provide a path change detector that is not prone to false positives.

SUMMARY OF THE INVENTION

The foregoing objects are achieved in this invention in which a path change is detected by multiplying the power of a signal on the output of a summation circuit in one channel of a telephone by a constant to produce a product. The product is compared with the power of a signal on the input of the summation circuit. A path change is indicated when the power of the product exceeds the power of a signal on the input of the summation circuit. Preferably, the comparison is made in successive frames of an audio signal and a path change is indicated when the power of a signal on the input of the summation circuit is exceeded in two or more successive frames.

BRIEF DESCRIPTION OF THE DRAWINGS

A more complete understanding of the invention can be obtained by considering the following detailed description in conjunction with the accompanying drawings, in which.

Those of skill in the art recognize that, once an analog signal is converted to digital form, all subsequent operations can take place in one or more suitably programmed microprocessors. Reference to "signal", for example, does not necessarily mean a hardware implementation or an analog signal. Data in memory, even a single bit, can be a signal. In other words, a block diagram can be interpreted as hardware, software, e.g. a flow chart, or a mixture of hardware and software.

Programming a microprocessor is well within the ability of those of ordinary skill in the art, either individually or in groups.

DETAILED DESCRIPTION OF THE INVENTION

Figure 1:
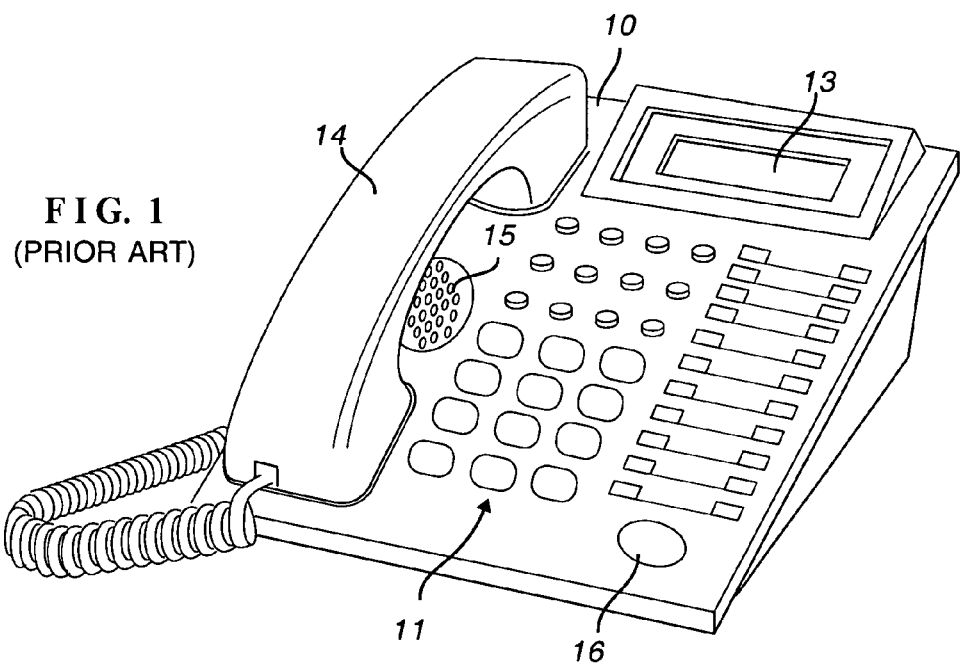
FIG. 1 is a perspective view of a desk telephone.
Figure 2:
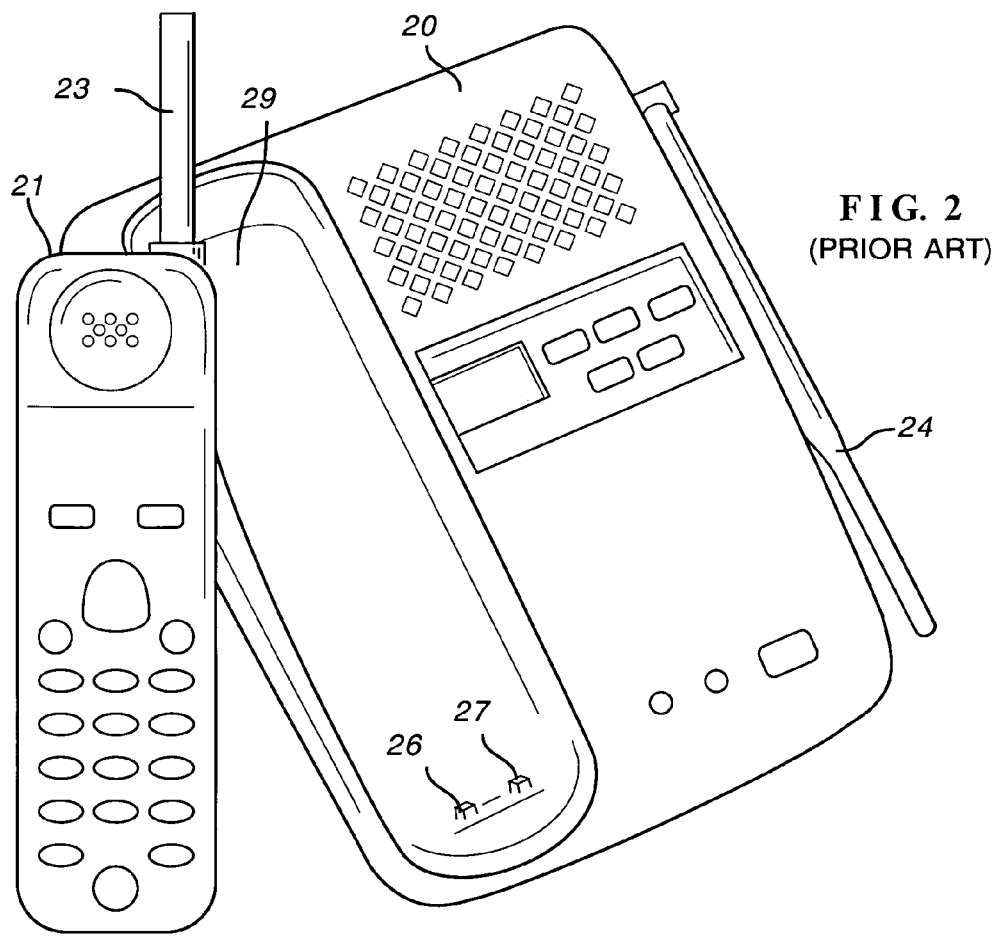
FIG. 2 is a perspective view of a cordless telephone.

This invention finds use in many applications where the electronics is essentially the same but the external appearance of the device may vary. FIG. 1 illustrates a desk telephone including base 10, keypad 11, display 13 and handset 14. As illustrated in FIG. 1, the telephone has speaker phone capability including speaker 15 and microphone 16. The cordless telephone illustrated in FIG. 2 is similar except that base 20 and handset 21 are coupled by radio frequency signals, instead of a cord, through antennas 23 and 24. Power for handset 21 is supplied by internal batteries (not shown) charged through terminals 26 and 27 in base 20 when the handset rests in cradle 29.

Figure 3:
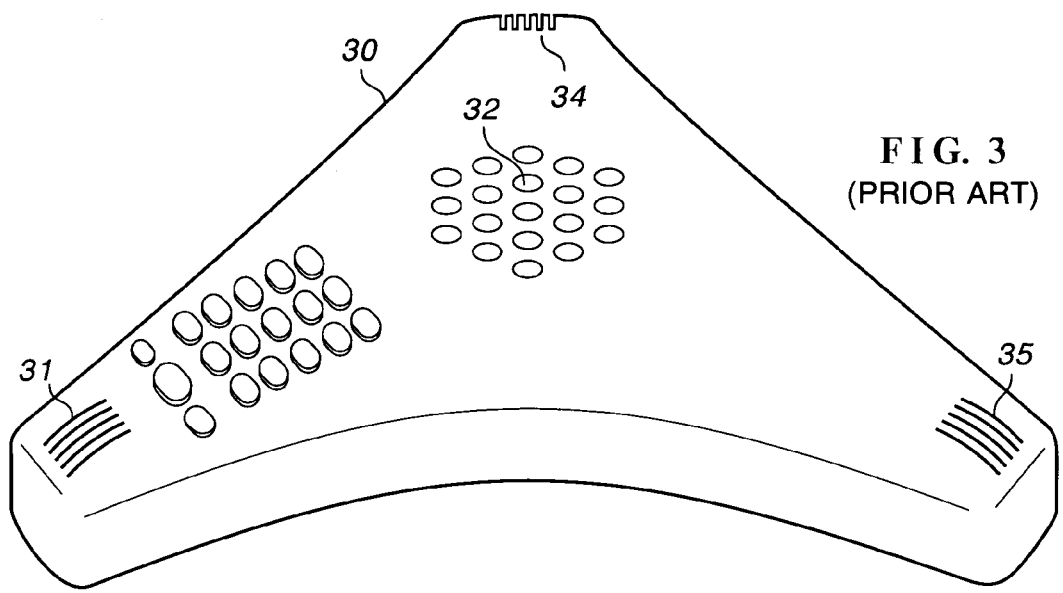
FIG. 3 is a perspective view of a conference phone or a speaker phone.

FIG. 3 illustrates a conference phone or speaker phone such as found in business offices. Telephone 30 includes microphone 31 and speaker 32 in a sculptured case. Telephone 30 may include several microphones, such as microphones 34 and 35 to improve voice reception or to provide several inputs for echo rejection or noise rejection, as disclosed in U.S. Pat. No. 5,138,651 (Sudo).

Figure 4:
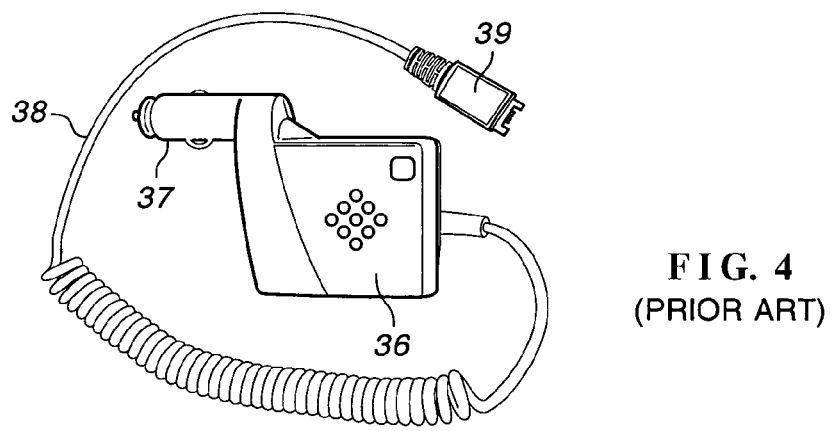
FIG. 4 is a perspective view of a hands free kit.
Figure 5:
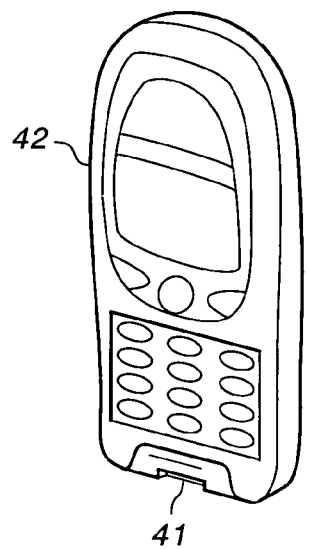
FIG. 5 is a perspective view of a cellular telephone.

FIG. 4 illustrates what is known as a hands free kit for providing audio coupling to a cellular telephone, illustrated in FIG. 5. Hands free kits come in a variety of implementations but generally include powered speaker 36 attached to plug 37, which fits an accessory outlet or a cigarette lighter socket in a vehicle. A hands free kit also includes cable 38 terminating in plug 39. Plug 39 fits the headset socket on a cellular telephone, such as socket 41 (FIG. 5) in cellular telephone 42. Some kits use RF signals, like a cordless phone, to couple to a telephone. A hands free kit also typically includes a volume control and some control switches, e.g. for going "off hook" to answer a call. A hands free kit also typically includes a visor microphone (not shown) that plugs into the kit. Audio processing circuitry constructed in accordance with the invention can be included in a hands free kit or in a cellular telephone.

Figure 6:
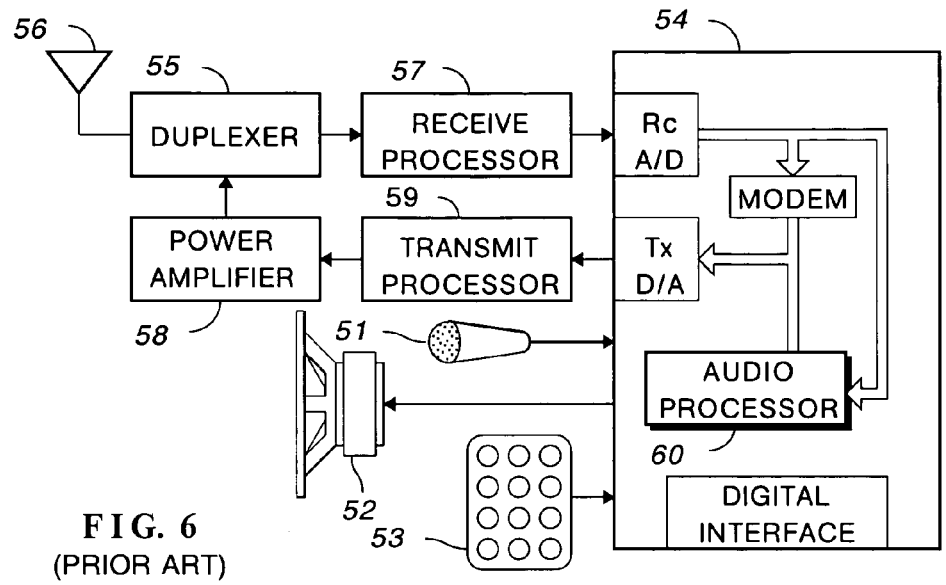
FIG. 6 is a generic block diagram of audio processing circuitry in a telephone.

The various forms of telephone can all benefit from the invention. FIG. 6 is a block diagram of the major components of a cellular telephone. Typically, the blocks correspond to integrated circuits implementing the indicated function. Microphone 51, speaker 52, and keypad 53 are coupled to signal processing circuit 54. Circuit 54 performs a plurality of functions and is known by several names in the art, differing by manufacturer. For example, Infineon calls circuit 54 a "single chip baseband IC." QualComm calls circuit 54 a "mobile station modem." The circuits from different manufacturers obviously differ in detail but, in general, the indicated functions are included.

A cellular telephone includes both audio frequency and radio frequency circuits. Duplexer 55 couples antenna 56 to receive processor 57. Duplexer 55 couples antenna 56 to power amplifier 58 and isolates receive processor 57 from the power amplifier during transmission. Transmit processor 59 modulates a radio frequency signal with an audio signal from circuit 54. In non-cellular applications, such as speakerphones, there are no radio frequency circuits and signal processor 54 may be simplified somewhat. Problems of echo cancellation and noise remain and are handled in audio processor 60. It is audio processor 60 that is modified to include the invention. How that modification takes place is more easily understood by considering the echo canceling and noise reduction portions of an audio processor in more detail.

Figure 7:
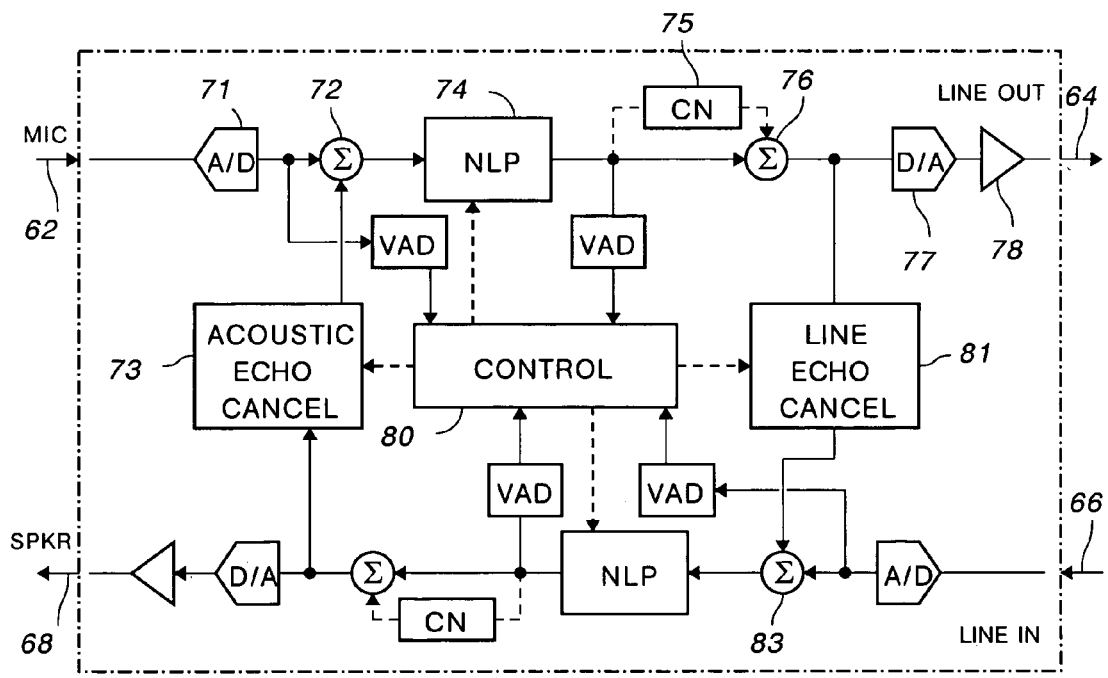
FIG. 7 is a more detailed block diagram of audio processing circuitry in a telephone.

FIG. 7 is a detailed block diagram of a noise reduction and echo canceling circuit; e.g. see chapter 6 of *Digital Signal Processing in Telecommunications* by Shenoi, Prentice-Hall, 1995, with the addition of four VAD circuits. The following describes signal flow through the transmit channel, from microphone input 62 to line output 64. The receive channel, from line input 66 to speaker output 68, works in the same way.

A new voice signal entering microphone input 62 may or may not be accompanied by a signal from speaker output 68. The signals from input 62 are digitized in A/D converter 71 and coupled to summation circuit 72. There is, as yet, no signal from echo canceling circuit 73 and the data proceeds to non-linear filter 74, which is initially set to minimum suppression.

The output from non-linear filter 74 is coupled to summation circuit 76, where comfort noise 75 is optionally added to the signal. The signal is then converted back to analog form by D/A converter 77, amplified in amplifier 78, and coupled to line output 64. Data from the four VAD circuits is supplied to control 80, which uses the data for allocating sub-bands, echo elimination, double talk detection, and other functions. Control circuit 40 (FIG. 7) can be part of control 80 or separate; e.g. as when located in a hands free kit. Circuit 73 reduces acoustic echo and circuit 81 reduces line echo. The operation of these last two circuits is known per se in the art; e.g. as described in the above-identified patent.

Figures 8, 9:
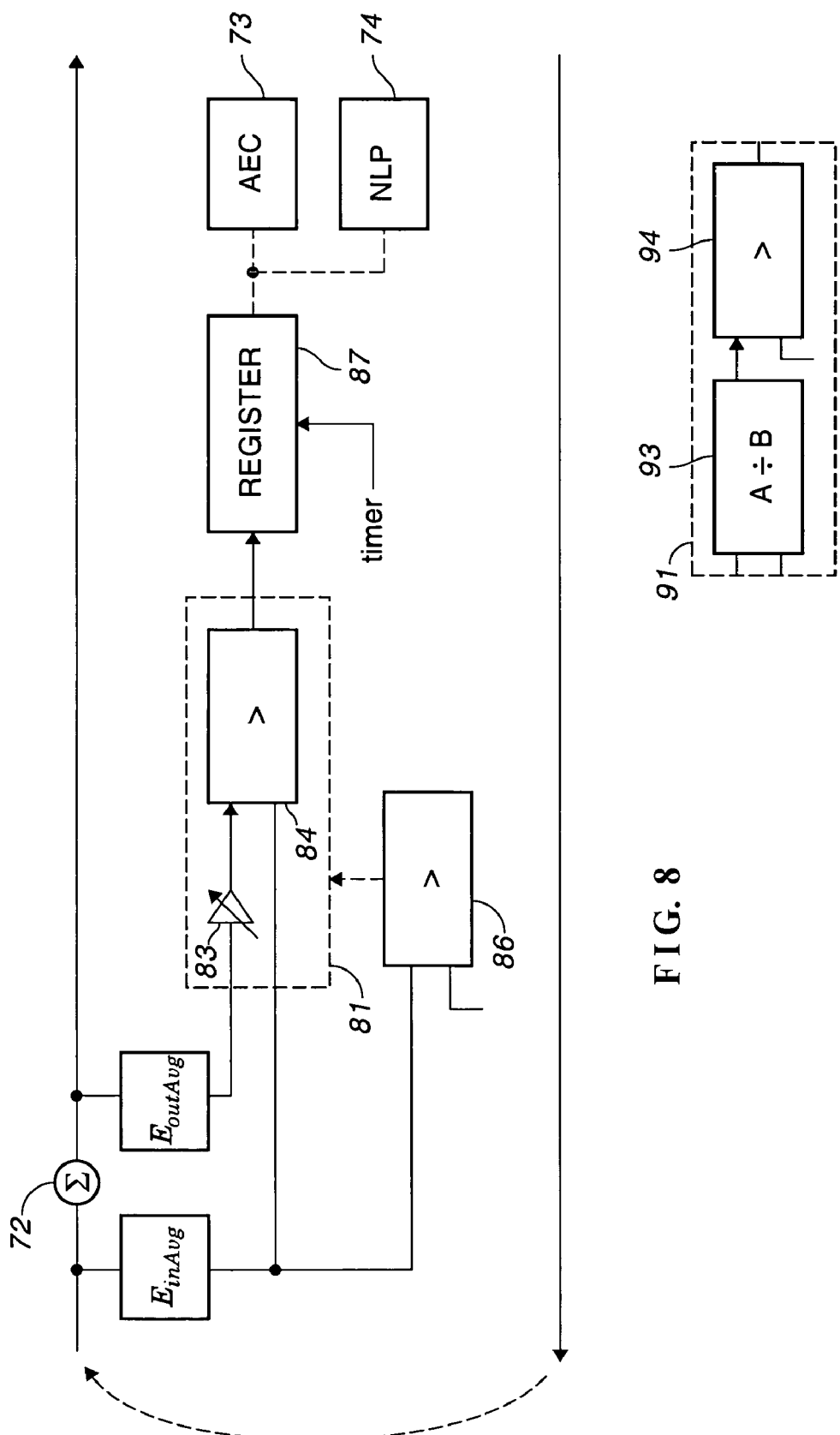
FIG. 8 is a block diagram of an path change detector constructed in accordance with the invention.
FIG. 9 is a block diagram of a path change detector constructed in accordance with an alternative embodiment of the invention.

FIG. 8 is a block diagram of a circuit constructed in accordance with a preferred embodiment of the invention for detecting path change and controlling an echo canceling circuit accordingly. A path change occurs when there is a change in the impulse response that an acoustic echo canceler (AEC) is trying to estimate. This change can happen when the position of the loudspeaker or the microphone changes or when an object comes between the loudspeaker and the microphone. Anytime the path changes, the impulse response changes, and the AEC must adapt to a new impulse response. During the time that the AEC is adapting, echoes are not canceled completely. A path change detector (PCD) provides a control signal for other forms of echo cancellation, e.g. non-linear processing (NLP), to be used until the AEC adapts. The PCD preferably resets the AEC on detecting a path change to allow for faster reconvergence (starting from default settings with larger step sizes is generally faster than starting from the last solution with smaller step sizes.)

In accordance with the invention, the PCD monitors the ratio of energies to and from summation circuit 72. The comparison can be made more suitable for software calculations by rearranging terms to replace the division by multiplication and by using a multiplier that is a reciprocal that can be calculated during initialization.

$$pcd = \left(\frac{E_{outAvg}}{E_{inAvg}}\right) > thr_{pcd} \quad (1)$$

$$pcd = \left(E_{outAvg} \cdot \frac{1}{thr_{pcd}}\right) > E_{inAvg} \quad (2)$$

The output from the PCD is true when the AEC is divergent. In normal operation, an AEC should diverge only when the echo path has changed. Other conditions can cause an AEC to diverge and cause the PCD to produce a false positive. One such condition is handset mode. In handset mode, near-end speech is much louder than an echo. If the AEC is allowed to adapt during double talk, it will diverge because of the louder near-end speech and the PCD will produce a false positive. False positives cause the system to spend more time in half-duplex mode than it should. Path change detection can be turned off during handset mode (detected elsewhere in audio processor 60, FIG. 6) because echo paths are much more dependent on non-varying elements such as the handset itself and the human head.

Nevertheless, incorrect indications of path change can be a problem in normal system operation and further processing of positive indications is provided in accordance with the invention. Several qualifications and hold offs are provided to reduce the chance of false positives.

In FIG. 8, the initial comparison of the output from summation circuit 72 with the input to the summation circuit takes place in path change detector 81. FIG. 8 illustrates a preferred embodiment of the invention, which implements equation (2) above. The output signal from summation circuit 72 is adjusted in amplitude by programmable gain amplifier 83 and the adjusted signal is compared with the input signal to summation circuit 72 in comparator 84. The gain of amplifier 83 is $1/thr_{pcd}$. Path change detector 81 produces and output once per frame of the digitized input signal to summation circuit 72.

Comparator 86 prevents PCD 81 from operating unless there is a good likelihood of an echo signal to analyze. If there is no (or minimal) echo from the speaker, or there is no (or minimal) microphone input energy, then the input signal to the PCD is small. In such a situation, noise will begin to dominate, resulting in incorrect indications of path change. To prevent this, comparator 86 looks at the input to summation circuit 72 and compares it with a threshold. If the signal energy, or amplitude, is below the threshold, comparator 81 is prevented from producing an output. Alternatively, the output of comparator 81 can be prevented from changing state.

Spurious changes in the energy of signals can cause false positives. Path changes generally result from slowly changing conditions. In accordance with another aspect of the invention, responses to rapid changes are avoided by adding register 87, which acts as a filter to prevent false positives. The indication of a path change must be true for a consecutive number of audio frames before it is regarded as a valid path change. The number is not critical and is readily determined empirically to suit the particular environment of a telephone.

The output of register 87 also smoothes the results by providing a hold off period when a path change is detected. During the hold off period, path change is not detected and it is assumed that the path does not change until after the hold off period. This prevents incorrect indications resulting from the echo path continuing to change and from the echo cancellation operation changing during adaptation.

For example, if one requires five positive outputs as an indication of path change, register 87 can be implemented as a five bit shift register. The five bits, 11111, are logically AND-ed to produce a logic "true" output signal. After the output goes true, there is a delay of five bits, or five audio frames, until the output goes "false," enabling detection. Two registers could be used instead of one to provide unequal amounts of delay.

The output of register 87 is coupled to echo canceling circuit 73 and non-linear processor 74. When the output of register 87 is true, echo canceling is disabled and non-linear processing is enabled.

FIG. 9 is a block diagram of an alternative embodiment of the invention in which path change detector 91 implements equation (1) above. Divider 93 determines the ratio of output to input at summation circuit 72. The ratio, or quotient, is compared with a threshold in comparator 94. The output from comparator 94 is coupled to register 87 (FIG. 8) and the circuit operates as described in conjunction with FIG. 8.

The invention thus provides an efficient adaptive filter that is stable during abrupt changes in the echo path and is not prone to false positives.

Having thus described the invention, it will be apparent to those of skill in the art that various modifications can be made within the scope of the invention. For example, circuits 72 and 83 (FIG. 7) are called "summation" circuits with the understanding that a simple arithmetic process is being carried out, which can be either digital or analog, whether the process entails actually subtracting one signal from another signal or inverting (changing the sign of one signal and then adding it to another signal. Stated another way, "summation" is defined herein as generic to addition and subtraction. Similarly, as used herein "magnitude" can refer to amplitude, power, or energy.

What is claimed as the invention is:

1. In a telephone including an audio frequency circuit having a first channel, a second channel, and at least one echo canceling circuit coupled between said first channel and said second channel, the improvement comprising:
   a summation circuit having an input and an output in said first channel;
   a path change detector coupled to said input and to said output, said path change detector producing a first output signal when said echo canceling circuit diverges and producing a second output signal otherwise;
   wherein said path change detector includes:
      a programmable gain amplifier having an input coupled to the output of said summation circuit and an output;
      a comparator having a first input coupled to the output of said programmable gain amplifier and a second input coupled to the input of said summation circuit, whereby said path change detector, in effect, determines whether or not the quotient of the magnitude of a signal on the output of the summation circuit divided by the magnitude of a signal on the input of the summation circuit exceeds a threshold.

2. The telephone as set forth in claim 1 wherein said path change detector produces said first output signal during double talk conditions.

3. The telephone as set forth in claim 1 wherein said path change detector is coupled to said echo canceling circuit and said first output signal disables said echo canceling circuit.

4. The telephone as set forth in claim 3 and further including:
   a register coupled between said path change detector and said echo canceling circuit for storing a plurality of occurrences of said first output signal, whereby there are at least two consecutive occurrences of said first output signal before said echo canceling circuit is disabled.

5. The telephone as set forth in claim 1 wherein said path change detector is coupled to said echo canceling circuit and said first output signal resets said echo canceling circuit.

6. The telephone as set forth in claim 5 and further including:
   a register coupled between said path change detector and said echo canceling circuit for storing a plurality of occurrences of said first output signal, whereby there are at least two consecutive occurrences of said first output signal before said echo canceling circuit is reset.

7. The telephone as set forth in claim 1 and further including:
   a comparator having a first input coupled to said summation circuit, a second input coupled to a threshold signal, and an output to said path change detector;

said comparator disabling said path change detector when the signal on said first input does not exceed said threshold signal.

8. In a telephone including an audio frequency circuit having a first channel, a second channel, and at least one echo canceling circuit coupled between said first channel and said second channel, the improvement comprising:

a summation circuit having an input and an output in said first channel;

a path change detector coupled to said input and to said output, said path change detector producing a first output signal when said echo canceling circuit diverges and producing a second output signal otherwise;

wherein said path change detector includes:

a first circuit for producing a quotient signal representing the quotient of the magnitude of a signal on the output of the summation circuit divided by the magnitude of a signal on the input of the summation circuit; and a comparator for comparing said quotient signal with a threshold and producing said first output signal when said quotient signal exceeds said threshold.

9. A method for detecting path change in a telephone having an audio frequency circuit including a first channel, a second channel, at least one echo canceling circuit coupled between the channels, and a summation circuit having an input and an output in the first channel, said method comprising the steps of:

dividing the magnitude of a signal on the output of the summation circuit by the magnitude of a signal on the input of the summation circuit to produce a quotient;

comparing the quotient with a threshold; and indicating a path change when the quotient exceeds the threshold.

10. The method as set forth in claim 9 wherein:

said steps are repeated for successive frames of an audio signal; and a path change is detected in more than two successive frames before a path change is indicated.

11. A method for detecting path change in a telephone having an audio frequency circuit including a first channel, a second channel, at least one echo canceling circuit coupled between the channels, and a summation circuit having an input and an output in the first channel, said method comprising the steps of:

multiplying the magnitude of a signal on the output of the summation circuit by a constant to produce a product;

comparing the magnitude of the product with the magnitude of a signal on the input of the summation circuit; and indicating a path change when the magnitude of the product exceeds the magnitude of a signal on the input of the summation circuit.

12. The method as set forth in claim 11 wherein:

said steps are repeated for successive frames of an audio signal; and a path change is detected in more than two successive frames before a path change is indicated.

* * * * *